United States Patent
Sim et al.

(10) Patent No.: US 11,368,682 B2
(45) Date of Patent: Jun. 21, 2022

(54) METHOD AND DEVICE FOR ENCODING/DECODING IMAGE

(71) Applicant: Intellectual Discovery Co., Ltd., Seoul (KR)

(72) Inventors: Dong Gyu Sim, Seoul (KR); Ho Chan Ryu, Seoul (KR); Yong Jo Ahn, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 16/096,704

(22) PCT Filed: Apr. 19, 2017

(86) PCT No.: PCT/KR2017/004192
§ 371 (c)(1),
(2) Date: Oct. 26, 2018

(87) PCT Pub. No.: WO2017/188652
PCT Pub. Date: Nov. 2, 2017

(65) Prior Publication Data
US 2019/0158827 A1    May 23, 2019

(30) Foreign Application Priority Data

| Apr. 26, 2016 | (KR) | 10-2016-0051048 |
| Apr. 26, 2016 | (KR) | 10-2016-0051058 |
| May 3, 2016 | (KR) | 10-2016-0054610 |

(51) Int. Cl.
*H04N 19/11* (2014.01)
*H04N 19/105* (2014.01)
(Continued)

(52) U.S. Cl.
CPC .......... *H04N 19/11* (2014.11); *H04N 19/105* (2014.11); *H04N 19/107* (2014.11);
(Continued)

(58) Field of Classification Search
USPC ...................................................... 375/240.12
See application file for complete search history.

(56) References Cited

U.S. PATENT DOCUMENTS

| 8,861,593 B2 | 10/2014 | Liu |
| 9,313,502 B2 | 4/2016 | Song et al. |

(Continued)

FOREIGN PATENT DOCUMENTS

| CN | 101895751 A | 11/2010 |
| CN | 102396230 A | 3/2012 |

(Continued)

OTHER PUBLICATIONS

Liu, Chenghao et al., "On indication of the use of current reference picture", *Joint Collaboration Team on Video Coding (JCT-VC) of ITU-T SG 16 WP3 and ISO/IEC JTC 1/SC 29/WG 11*, 21st Meeting: Warsaw, Poland, Jun. 19-26, 2015 (5 pages in English).

(Continued)

*Primary Examiner* — Patricia I Young
(74) *Attorney, Agent, or Firm* — Sughrue Mion, PLLC

(57) ABSTRACT

A device for encoding/decoding the image according to the present invention includes an intra prediction module configured to: determine an intra prediction mode of a current block; determine a scanning order of multiple sub blocks in the current block on the basis of the determined intra prediction mode; and perform intra prediction of the current block on the basis of the determined scanning order.

6 Claims, 13 Drawing Sheets

(51) Int. Cl.
*H04N 19/107* (2014.01)
*H04N 19/117* (2014.01)
*H04N 19/124* (2014.01)
*H04N 19/13* (2014.01)
*H04N 19/176* (2014.01)
*H04N 19/513* (2014.01)
*H04N 19/593* (2014.01)
*H04N 19/615* (2014.01)
*H04N 19/635* (2014.01)
*H04N 19/82* (2014.01)
*H04N 19/91* (2014.01)

(52) U.S. Cl.
CPC ......... *H04N 19/117* (2014.11); *H04N 19/124* (2014.11); *H04N 19/13* (2014.11); *H04N 19/176* (2014.11); *H04N 19/513* (2014.11); *H04N 19/593* (2014.11); *H04N 19/615* (2014.11); *H04N 19/635* (2014.11); *H04N 19/82* (2014.11); *H04N 19/91* (2014.11)

(56) References Cited

U.S. PATENT DOCUMENTS

| | | | |
|---|---|---|---|
| 2007/0041450 | A1 | 2/2007 | Kim et al. |
| 2007/0110159 | A1* | 5/2007 | Wang ............... H04N 19/117 375/240.16 |
| 2012/0093426 | A1 | 4/2012 | Sato |
| 2013/0272623 | A1* | 10/2013 | Jeon ............... H04N 19/159 382/238 |
| 2013/0336398 | A1 | 12/2013 | Lee et al. |
| 2014/0233646 | A1 | 8/2014 | Matsuo et al. |
| 2016/0044336 | A1* | 2/2016 | Lee ............... H04N 19/157 375/240.12 |
| 2016/0255371 | A1* | 9/2016 | Heo ............... H04N 19/597 375/240.13 |
| 2016/0373764 | A1* | 12/2016 | Kwon ............... H04N 19/11 |
| 2016/0373782 | A1* | 12/2016 | Zhao ............... H04N 19/463 |
| 2017/0150180 | A1* | 5/2017 | Lin ............... H04N 19/59 |
| 2017/0310986 | A1* | 10/2017 | Lin ............... H04N 19/82 |
| 2019/0052875 | A1* | 2/2019 | Son ............... H04N 19/593 |

FOREIGN PATENT DOCUMENTS

| | | |
|---|---|---|
| CN | 102474617 A | 5/2012 |
| CN | 103891278 A | 6/2014 |
| EP | 2 451 160 A2 | 5/2012 |
| KR | 10-2010-0037180 A | 4/2010 |
| KR | 10-2012-0103517 A | 9/2012 |
| KR | 10-2012-0118782 A | 10/2012 |
| KR | 10-2012-0140181 A | 12/2012 |
| KR | 10-2014-0029503 A | 3/2014 |
| KR | 101377527 B1 | 3/2014 |
| KR | 10-2014-0064972 A | 5/2014 |
| KR | 10-2014-0093870 A | 7/2014 |
| KR | 10-2014-0129425 A | 11/2014 |
| WO | WO 2013/069530 A1 | 5/2013 |

OTHER PUBLICATIONS

International Search Report dated Jul. 26, 2017 in corresponding International Patent Application No. PCT/KR2017/004192 (3 pages in English and 3 pages in Korean).

Jianle Chen et al., "Further improvements to HMKTA-1.0", ITU—Telecommunications Standardization Sector Video Coding Experts Group (VCEG), Document VCEG-AZ07 v2, 2015 (8 pages total).

Shohei Matsuo et al., "Modification of Intra Angular Prediction in HEVC", IEEE, 2012 (4 pages total).

* cited by examiner

METHOD AND DEVICE FOR ENCODING/DECODING IMAGE

CROSS REFERENCE TO RELATED APPLICATIONS

This application is a U.S. national stage application of International Application No. PCT/KR2017/004192 filed on Apr. 19, 2017, which claims the benefit of Korean Patent Application No. 10-2016-0051048 filed on Apr. 26, 2016 and Korean Patent Application No. 10-2016-0051058 filed on Apr. 26, 2016 and Korean Patent Application No. 10-2016-0054610 filed on May 3, 2016, in the Korean Intellectual Property Office, the entire disclosures of which are incorporated by reference for all purposes.

TECHNICAL FIELD

The present invention relates to a method and device for encoding/decoding a video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image compression techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; and the like. Image data may be effectively compressed by using such image compression technology, and may be transmitted or stored.

In the meantime, in addition to demands for high-resolution images, demands for stereographic image content, which is a new image service, have also increased. A video compression technique for effectively providing stereographic image content with high resolution and ultra-high resolution is being discussed.

DISCLOSURE

Technical Problem

The present invention is intended to enhance compression efficiency in inter prediction.

The present invention is intended to enhance compression efficiency in intra prediction.

However, the technical problems to be solved by the embodiments are not limited to the aforementioned technical problems and other technical problems may present.

Technical Solution

The present invention provides an inter prediction method and device based on a current picture reference mode.

The present invention provides a method and device for deriving a motion vector for a current picture reference mode.

The present invention provides a method and device for determining encoding/decoding order of sub blocks belonging to a current block by taking an intra prediction mode of the current block into consideration.

The present invention provides a method and device for generating a reference sample for intra prediction on the basis of an interpolation filter.

The present invention provides a method and device for determining an interpolation filter being applied to a nearby sample by taking at least one among a block size and an intra prediction mode into consideration.

Advantageous Effects

According to the present invention, efficiency of inter prediction may be enhanced on the basis of the current picture reference mode.

Also, according to the present invention, the motion vector for the current picture reference mode may be effectively derived.

Also, according to the present invention, efficiency of intra prediction may be enhanced on the basis of adaptive encoding/decoding order.

Also, according to the present invention, the reference sample for intra prediction may be effectively generated by determining the optimum interpolation filter and using the determined interpolation filter.

BEST MODE

Figure 1:
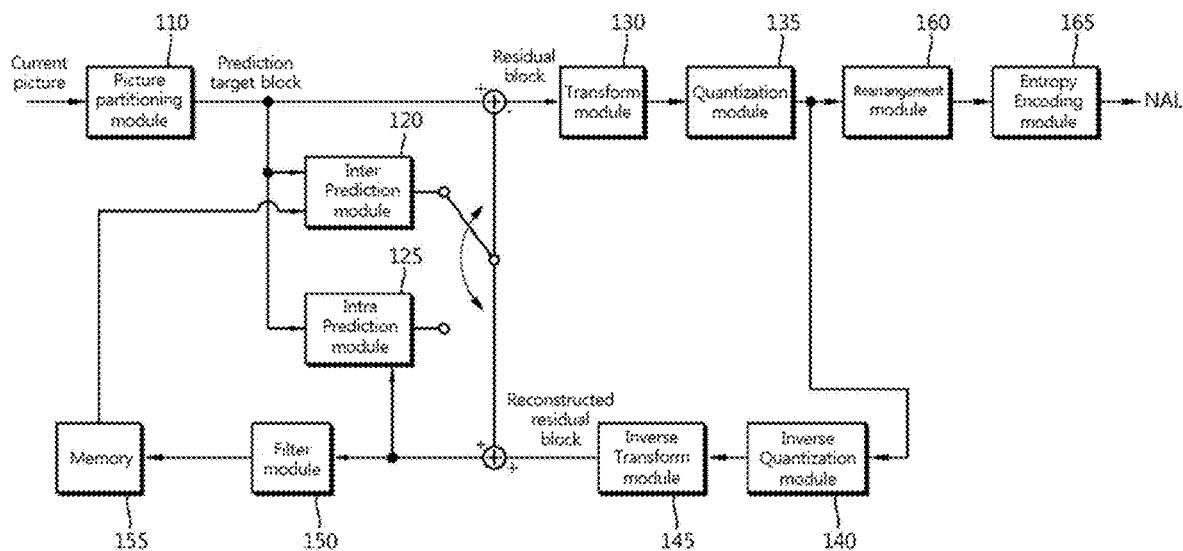
FIG. 1 is a block diagram illustrating a device for encoding an image according to an embodiment of the present invention.

In an intra prediction method according to the present invention, an intra prediction mode of a current block may be determined, a scanning order of multiple sub blocks in the current block may be determined on the basis of the determined intra prediction mode, and intra prediction of the current block may be performed on the basis of the determined scanning order.

In an inter prediction method according to the present invention, a motion vector of a current block may be derived, a reference block of the current block may be determined on the basis of the motion vector of the current block, and motion compensation of the current block may be performed on the basis of the determined reference block, wherein the reference block may belong to the same picture as the current block.

In an intra prediction method according to the present invention, a nearby sample for intra prediction of a current block may be specified, predetermined filtering may be performed on the specified nearby sample, a reference sample for the intra prediction may be generated by applying an interpolation filter to the filtered nearby sample, and the intra prediction of the current block may be performed on the basis of the generated reference sample.

In a device for encoding/decoding an image according to the present invention, included is an intra prediction module configured to: determine an intra prediction mode of a current block; determine a scanning order of multiple sub blocks in the current block on the basis of the determined intra prediction mode; and perform intra prediction of the current block on the basis of the determined scanning order.

In a device for encoding/decoding an image according to the present invention, included is an inter prediction module configured to: derive a motion vector of a current block; determine a reference block of the current block on the basis of the motion vector of the current block; and perform motion compensation of the current block on the basis of the determined reference block, wherein the reference block may belong to the same picture as the current block.

In a device for encoding/decoding an image according to the present invention, included is an intra prediction module configured to: specify a nearby sample for intra prediction of a current block; perform predetermined filtering on the specified nearby sample; generate a reference sample for the intra prediction by applying an interpolation filter on the filtered nearby sample; and perform the intra prediction of the current block on the basis of the generated reference sample.

MODE FOR INVENTION

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, "first", "second", etc. can be used to describe various elements, but the elements are not to be construed as being limited to the terms. The terms are only used to differentiate one element from other elements. For example, the "first" element may be named the "second" element without departing from the scope of the present invention, and the "second" element may also be similarly named the "first" element. The term "and/or" includes a combination of a plurality of items or any one of a plurality of terms.

It will be understood that when an element is simply referred to as being "connected to" or "coupled to" another element without being "directly connected to" or "directly coupled to" another element in the present description, it may be "directly connected to" or "directly coupled to" another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same elements in the drawings are denoted by the same reference numerals, and a repeated description of the same elements will be omitted.

FIG. 1 is a block diagram illustrating a device for encoding an image according to an embodiment of the present invention.

Referring to FIG. 1, the device 100 for encoding an image may include: a picture division module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constituents shown in FIG. 1 are independently shown so as to represent characteristic functions different from each other in the device for encoding the image. Thus, it does not mean that each constituent is constituted in a constituent unit of segregated hardware or software. In other words, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is divided are also included in the scope of the present invention, if not departing from the essence of the present invention.

Also, some of elements may not be indispensable elements performing essential functions of the present invention but be selective elements improving only performance thereof. The present invention may be implemented by including only the indispensable constituents for implementing the essence of the present invention except the elements used in improving performance. The structure including only the indispensable elements except the selective elements used in improving only performance is also included in the scope of the present invention.

The picture division module 110 may divide an input image into one or more blocks. Here, the block may mean a coding unit (CU), a prediction unit (PU), or a transform unit (TU). Division may be performed on the basis of a quad tree or a binary tree or both. The quad tree is a method of dividing an upper-layer block into four lower-layer blocks each of which the width and the height are half of the upper-layer block. The binary tree is a method of dividing an upper-layer block into two lower-layer blocks each of which the width or the height is half of the upper-layer block. In the binary tree, through division based on the binary tree, the block of which the height is half of the upper-layer block may be in a square or non-square shape.

Hereinafter, in the embodiment of the present invention, the coding unit may mean a unit performing encoding, or a unit performing decoding.

The prediction modules 120 and 125 may include an inter prediction module 120 performing inter prediction and an intra prediction module 125 performing intra prediction. Whether to perform inter prediction or intra prediction for the prediction may be determined, and detailed information (for example, an intra prediction mode, a motion vector, a reference picture, and the like) according to each prediction method may be determined. Here, the processing unit subjected to prediction may be different from the processing unit in which the prediction method and the detailed content are determined. For example, the prediction method, the prediction mode, and the like may be determined by the prediction unit, and prediction may be performed by the transform unit. A residual value (residual block) between the generated prediction block and an original block may be input to the transform module 130. Also, prediction mode information used for prediction, motion vector information, and the like may be encoded with the residual value by the entropy encoding module 165 and may be transmitted to a device for decoding. When a particular encoding mode is used, the original block is intactly encoded and transmitted to a decoding module without generating the prediction block by the prediction modules 120 and 125.

The inter prediction module 120 may predict the prediction unit on the basis of information on at least one among a previous picture and a subsequent picture of the current picture, or may predict the prediction unit on the basis of information on some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less from the reference picture. In the case of luma pixels, an 8-tap DCT-based interpolation filter having different coefficients may be used to generate pixel information on an integer pixel or less on a per-¼ pixel basis. In the case of chroma signals, a 4-tap DCT-based interpolation filter having different filter coefficients may be used to generate pixel information on an integer pixel or less on a per-⅛ pixel basis.

The motion prediction module may perform motion prediction based on the reference picture interpolated by the reference picture interpolation module. As methods for calculating a motion vector, various methods, such as a full search-based block matching algorithm (FBMA), a three step search (TSS) algorithm, a new three-step search (NTS) algorithm, and the like may be used. The motion vector may have a motion vector value on a per-½ or -¼ pixel basis on the basis of the interpolated pixel. The motion prediction module may predict a current prediction unit by changing the motion prediction method. As motion prediction methods, various methods, such as a skip method, a merge method, an advanced motion vector prediction (AMVP) method, and the like may be used.

The intra prediction module 125 may generate a prediction unit on the basis of reference pixel information around a current block, which is pixel information in the current picture. When the nearby block of the current prediction unit is a block subjected to inter prediction and thus a reference pixel is a pixel subjected to inter prediction, reference pixel information of a nearby block subjected to intra prediction is used instead of the reference pixel included in the block subjected to inter prediction. That is, when a reference pixel is unavailable, at least one reference pixel of available reference pixels is used instead of unavailable reference pixel information.

Prediction modes in intra prediction may include a directional prediction mode using reference pixel information depending on a prediction direction and a non-directional mode not using directional information in performing prediction. A mode for predicting luma information may be different from a mode for predicting chroma information, and in order to predict the chroma information, intra prediction mode information used to predict the luma information or predicted luma signal information may be utilized.

In the intra prediction method, a prediction block may be generated after applying an adaptive intra smoothing (AIS) filter to a reference pixel depending on the prediction modes. The type of AIS filter applied to the reference pixel may vary. In order to perform the intra prediction method, an intra prediction mode of the current prediction unit may be predicted from the intra prediction mode of the prediction unit around the current prediction unit. In predicting the prediction mode of the current prediction unit by using mode information predicted from the nearby prediction unit, when the intra prediction mode of the current prediction unit is the same as the intra prediction mode of the nearby prediction unit, information indicating that the current prediction unit and the nearby prediction unit have the same prediction mode is transmitted using predetermined flag information. When the prediction mode of the current prediction unit is different from the prediction mode of the nearby prediction unit, entropy encoding is performed to encode prediction mode information of the current block.

Also, a residual block may be generated on the basis of prediction units generated by the prediction modules 120 and 125, wherein the residual block includes information on a residual value which is a difference value between the prediction unit subjected to prediction and the original block of the prediction unit. The generated residual block may be input to the transform module 130.

The transform module 130 may transform the residual block including residual data by using a transform method, such as DCT, DST, and the like. Here, the transform method may be determined on the basis of the intra prediction mode of the prediction unit which is used to generate the residual block.

The quantization module 135 may quantize values transformed into a frequency domain by the transform module 130. Quantization coefficients may vary depending on a block or importance of an image. The values calculated by the quantization module 135 may be provided to the inverse quantization module 140 and the rearrangement module 160.

The rearrangement module 160 may perform rearrangement of coefficient values with respect to quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a predetermined scan type so as to change the coefficients to be in the form of one-dimensional vector.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAL).

The entropy encoding module 165 may encode a variety of information, such as residual value coefficient information and block type information of the coding unit, prediction mode information, division unit information, prediction unit information, transmission unit information, motion vector information, reference frame information, block interpolation information, filtering information, and the like from the rearrangement module 160 and the prediction modules 120 and 125.

The entropy encoding module 165 may entropy encode the coefficient values of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation unit, and the intra prediction module of the prediction modules 120 and 125 such that a reconstructed block can be generated.

The filter module 150 may include at least one of a deblocking filter, an offset correction module, and an adaptive loop filter (ALF).

The deblocking filter may remove block distortion that occurs due to boundaries between the blocks in the reconstructed picture. In order to determine whether to perform deblocking, whether to apply the deblocking filter to the current block may be determined on the basis of the pixels included in several rows and columns in the block. When the deblocking filter is applied to the block, a strong filter or a weak filter is applied depending on required deblocking filtering intensity. Also, in applying the deblocking filter, when performing horizontal direction filtering and vertical direction filtering, horizontal direction filtering and vertical direction filtering are configured to be processed in parallel.

The offset correction module may correct an offset from the original image on a per-pixel basis with respect to the image subjected to deblocking. In order to perform offset correction on a particular picture, used is a method of separating pixels of the image into the predetermined number of regions, determining a region to be subjected to offset, and applying the offset to the determined region or a method of applying an offset in consideration of edge information of each pixel.

Adaptive loop filtering (ALF) may be performed on the basis of the value obtained by comparing the filtered reconstructed image and the original image. The pixels included in the image may be divided into predetermined groups, a filter to be applied to each of the groups may be determined, and filtering may be individually performed on each group. Information on whether to apply ALF and a luma signal may be transmitted for each coding unit (CU). The form and filter coefficient of a filter for ALF to be applied may vary depending on each block. Also, the filter for ALF in the same form (fixed form) may be applied regardless of the characteristic of the application target block.

The memory 155 may store the reconstructed block of the picture calculated through the filter module 150. The stored reconstructed block or picture may be provided to the prediction modules 120 and 125 in performing inter prediction.

Figure 2:
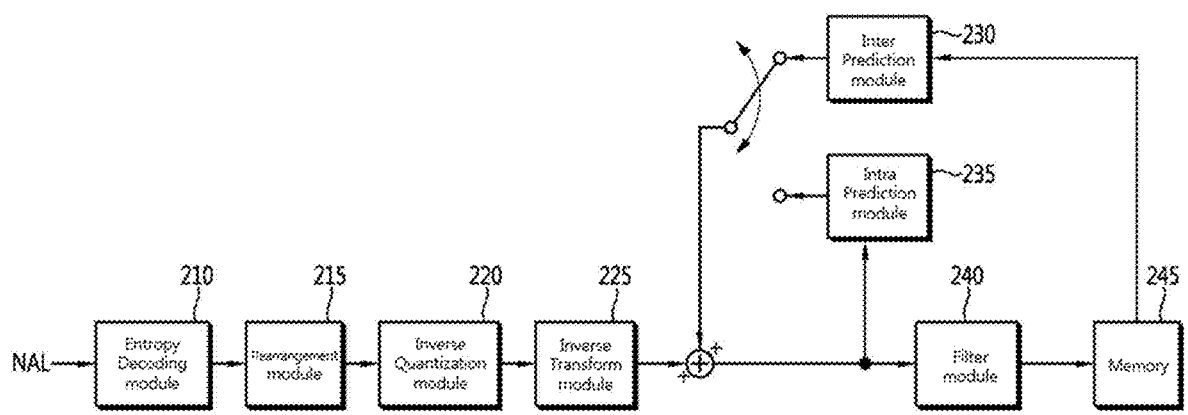
FIG. 2 is a block diagram illustrating a device for decoding an image according to an embodiment of the present invention.

FIG. 2 is a block diagram illustrating a device for decoding an image according to an embodiment of the present invention.

Referring to FIG. 2, a device 200 for decoding an image may include an entropy decoding module 210, a rearrangement module 215, an inverse quantization module 220, an inverse transform module 225, prediction modules 230 and 235, a filter module 240, and a memory 245.

When an image bitstream is input from the device for encoding the image, the input bitstream is decoded according to an inverse process of the device for encoding the image.

The entropy decoding module 210 may perform entropy decoding according to the inverse process of the entropy encoding by the entropy encoding module of the device for encoding the image. For example, corresponding to the methods performed by the device for encoding the image, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding.

The rearrangement module 215 may perform rearrangement on the bitstream entropy decoded by the entropy decoding module 210 on the basis of the rearrangement method used in the device for encoding. The coefficients expressed in the form of the one-dimensional vector may be reconstructed and rearranged into the coefficients in the form of the two-dimensional block. The rearrangement module 215 may perform rearrangement through a method of receiving information related to coefficient scanning performed in the device for encoding and of inversely scanning on the basis of the scanning order performed in the device for encoding.

The inverse quantization module 220 may perform inverse quantization on the basis of a quantization parameter received from the device for encoding and the rearranged coefficient values of the block.

The inverse transform module 225 may perform inverse transform on the transform coefficient subjected to inverse quantization using a predetermined transform method. Here, the transform method may be determined on the basis of information on the prediction method (inter/intra prediction), the size/shape of the block, the intra prediction mode, and the like.

The prediction modules 230 and 235 may generate a prediction block on the basis of information on prediction block generation received from the entropy decoding module 210 and information on a previously decoded block or picture received from the memory 245.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, and the like from the entropy decoding module 210, may separate a prediction unit in a current coding unit, and may determine whether inter prediction or intra prediction is performed on the prediction unit. By using information required in inter prediction of the current prediction unit received from the device for encoding the image, the inter prediction module 230 may perform inter prediction on the current prediction unit on the basis of information on at least one among a previous picture and a subsequent picture of the current picture including the current prediction unit. Alternatively, inter prediction may be performed on the basis of information on some pre-reconstructed regions in the current picture including the current prediction unit.

In order to perform inter prediction, it may be determined which of a skip mode, a merge mode, and an AMVP mode is used as the motion prediction method of the prediction unit included in the coding unit, on the basis of the coding unit.

The intra prediction module 235 may generate a prediction block on the basis of pixel information in the current picture. When the prediction unit is a prediction unit subjected to intra prediction, intra prediction is performed on the basis of intra prediction mode information of the prediction unit received from the device for encoding the image. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. The prediction mode of the prediction unit received from the device for encoding the image and AIS filter information are used in performing AIS filtering on the reference pixel of the current block. When the prediction mode of the current block is a mode in which AIS filtering is not performed, the AIS filter is not applied.

When the prediction mode of the prediction unit is a prediction mode in which intra prediction is performed on the basis of the pixel value obtained by interpolating the reference pixel, the reference pixel interpolation module may interpolate the reference pixel to generate the reference pixel in units of a pixel of an integer value or less. When the prediction mode of the current prediction unit is a prediction mode in which a prediction block is generated without interpolating the reference pixel, the reference pixel is not interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

From the device for encoding the image, received is information on whether the deblocking filter is applied to the relevant block or picture and information on whether a strong filter or a weak filter is applied when the deblocking filter is applied. The deblocking filter of the device for decoding the image may receive information on the deblocking filter from the device for encoding the image, and the device for decoding the image may perform deblocking filtering on the relevant block.

The offset correction module may perform offset correction on the reconstructed image on the basis of the type of offset correction, offset value information, and the like applied to the image in performing encoding.

The ALF may be applied to the coding unit on the basis of information on whether to apply the ALF, ALF coefficient information, and the like received from the device for encoding. The ALF information may be provided as being included in a particular parameter set.

The memory 245 may store the reconstructed picture or block for use as a reference picture or a reference block, and may provide the reconstructed picture to an output module.

Hereinafter, the intra prediction method will be described in detail with reference to FIGS. 3 to 8. Intra prediction may be performed on the current block using a predetermined intra prediction mode and a reference sample. The current block may be determined through division based on the tree structure (for example, the quad tree, and the binary tree). The current block may be the coding block (CU) or the prediction block (PU).

The intra prediction may be performed on each of sub blocks that make up the current block according to a predetermined scanning order. The current block may consist of one or more sub blocks. The current block may be defined as a set of sub blocks that share a single intra prediction mode.

The size/shape of the sub block may be pre-established and fixed in the device for encoding/decoding the image, or may be variably determined depending on the size/shape of the current block or transform block. Alternatively, the device for encoding the image may encode information indicating the size/shape of the sub block and may signal the result, and the device for decoding the image may determine the size/shape of the sub block on the basis of the signaled information.

The reference sample may be a neighboring sample of the current block (or the sub block). For example, the reference sample may belong to at least one nearby block positioned on the left, the bottom left, the top left, the top, or the top right of the current block (or the sub block). The reference sample may include a reference-possible sample for intra prediction of the current block (or the sub block) and/or a sample generated through a process of generating a predetermined reference sample.

The scanning order may be a pre-established, fixed scanning order (hereinafter, referred to as "a first method") in the device for encoding/decoding the image, or may be an adaptive scanning order (hereinafter, referred to as "a second method") based on the intra prediction mode of the current block. Either the first method or the second method may be used selectively. To this end, information indicating whether the adaptive scanning order is used may be signaled. For example, when the information indicates a value of zero, the first method is used, and when the information indicates a value of one, the second method is used. Alternatively, on the basis of at least one among the prediction mode of the current block, information on whether the intra prediction mode is in directionality, the directionality/angle of the intra prediction mode, the scanning type of the transform coefficient, a transform technique, and the block size/shape, either the first method or the second method may be used selectively.

Figure 3:
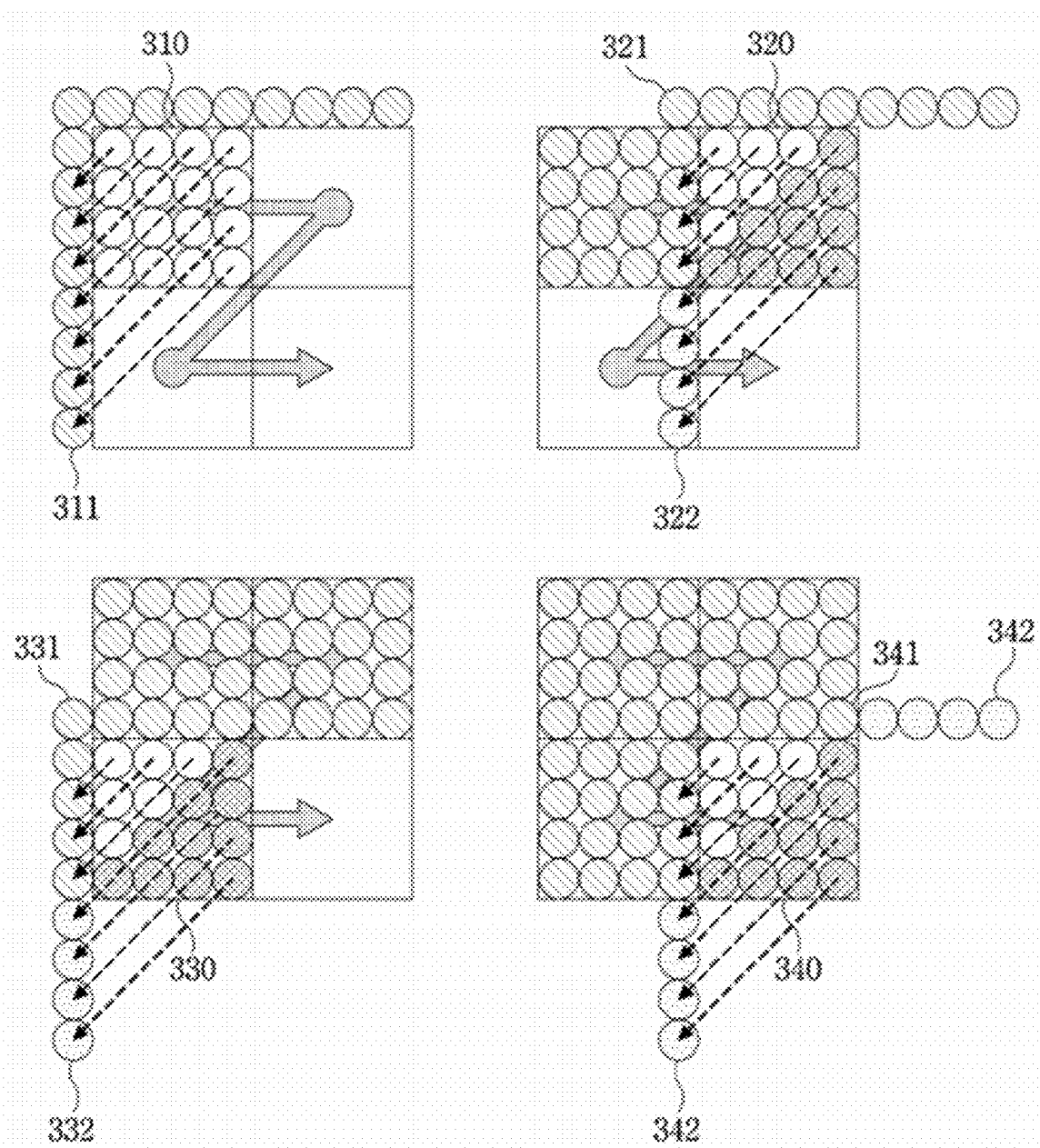
FIG. 3 is a diagram illustrating intra prediction based on a fixed scanning order according to an embodiment of the present invention.

FIG. 3 is a diagram illustrating intra prediction based on a fixed scanning order according to an embodiment of the present invention.

In the embodiment, it is assumed that the fixed scanning order is z scanning and nearby samples in diagonal directions are referenced. Here, the nearby sample may include at least one among the reference-possible or reference-impossible sample, and the sample generated through the process of generating the predetermined reference sample.

Referring to FIG. 3, the current block may consist of four sub blocks 310, 320, 330, and 340. According to z scanning, prediction/reconstruction may be performed on a first sub block 310, a second sub block 320, a third sub block 330, and a fourth sub block 340 in this order.

The first sub block 310 may refer to a nearby sample 311 (a sample indicated in oblique lines) reconstructed before the first sub block.

The second sub block 320 may be separated into a region of samples indicated in white (hereinafter, referred to as "a first region") and a region of samples indicated in grayscale (hereinafter, referred to as "a second region"). The first region is a region that refers to a pre-reconstructed nearby sample 321 (a sample indicated in oblique lines), and the second region is a region that refers to a non-reconstructed or reference-impossible sample 322 (a sample filled with dots). The sample in the second region has a low spatial correlation with the sample 322, which may result in performance degradation of intra prediction.

Similarly, the third sub block 330 may be separated into a region of samples indicated in white (hereinafter, referred to as "a first region") and a region of samples indicated in grayscale (hereinafter, referred to as "a second region"). The first region is a region that refers to a pre-reconstructed nearby sample 331 (a sample indicated in oblique lines), and the second region is a region that refers to a non-reconstructed or reference-impossible sample 332 (a sample filled with dots). The sample in the second region has a low spatial correlation with the sample 332, which may result in performance degradation of intra prediction.

Similarly, the fourth sub block 340 may be separated into a region of samples indicated in white (hereinafter, referred to as "a first region") and a region of samples indicated in grayscale (hereinafter, referred to as "a second region"). The first region is a region that refers to a pre-reconstructed nearby sample 341 (a sample indicated in oblique lines), and the second region is a region that refers to a non-reconstructed or reference-impossible sample 342 (a sample filled with dots). The sample in the second region has a low spatial correlation with the sample 342, which may result in performance degradation of intra prediction.

Figure 4:
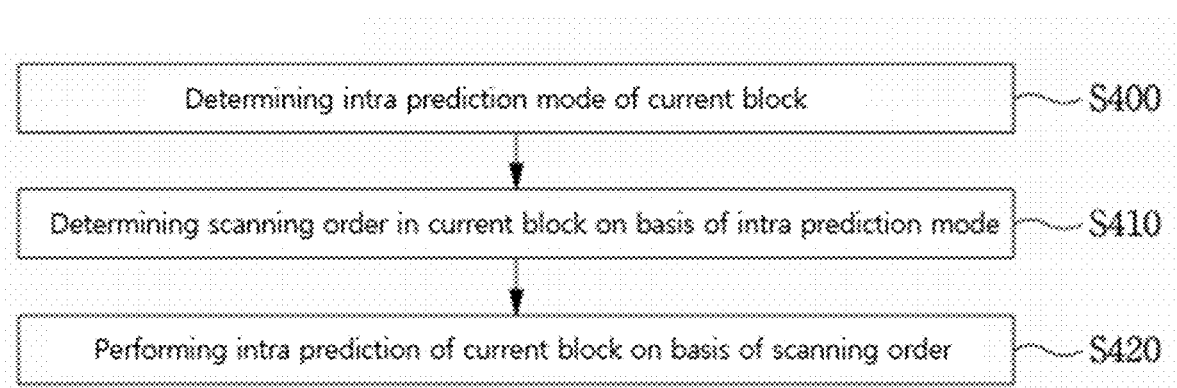
FIG. 4 is a diagram illustrating an intra prediction method based on an adaptive scanning order according to an embodiment of the present invention.

FIG. 4 is a diagram illustrating an intra prediction method based on an adaptive scanning order according to an embodiment of the present invention.

Referring to FIG. 4, the intra prediction mode of the current block may be determined at step S400.

Specifically, N intra prediction modes pre-defined in the device for encoding/decoding the image may be grouped into multiple groups. The N may be an integer equal to or greater than 35. For example, a first group may consist of candidate modes (most probable mode, MPM), and a second group may consist of modes except the candidate modes from the N intra prediction modes. The candidate mode may be derived on the basis of at least one among the intra prediction mode of the nearby block and a default mode according to a rule pre-established in the device for encoding/decoding the image. The number of candidate modes may be three, four, five, six, or more.

The intra prediction mode of the current block may be determined using in information specifying a group to which the intra prediction mode of the current block belongs and/or information specifying the intra prediction mode of the current block in the relevant group.

On the basis of the intra prediction mode determined at step S400, the scanning order in the current block may be determined at step S410.

The scanning order may be determined by taking whether the intra prediction mode is a non-directional mode or a directional mode into consideration. Alternatively, the scanning order may be determined by taking the directionality/angle of the intra prediction mode into consideration. For example, a process of determining the scanning order may be implemented by a process of determining a category of the intra prediction mode by taking the directionality of the intra prediction mode into consideration, and by a process of determining the scanning order on the basis of the determined category. The category may be defined as a set of intra prediction modes with similar directionality. To this end, the N intra prediction modes pre-defined in the device for encoding/decoding the image may be classified into multiple categories. The device for encoding/decoding the image may define a mapping relation between a specific category and a scanning order.

On the basis of the scanning order determined at step S410, intra prediction of the current block may be performed at step S420. According to the scanning order, the sub blocks of the current block may be predicted/reconstructed in order. Prediction and reconstruction may be performed on a prior sub block, and then prediction and reconstruction may be performed on a posterior sub block. Here, the posterior sub block may refer to the nearby sample of the current block and/or the reconstruction sample of the prior sub block. In this way, the sub blocks belonging to the current block may be predicted and reconstructed in order.

Figure 5:
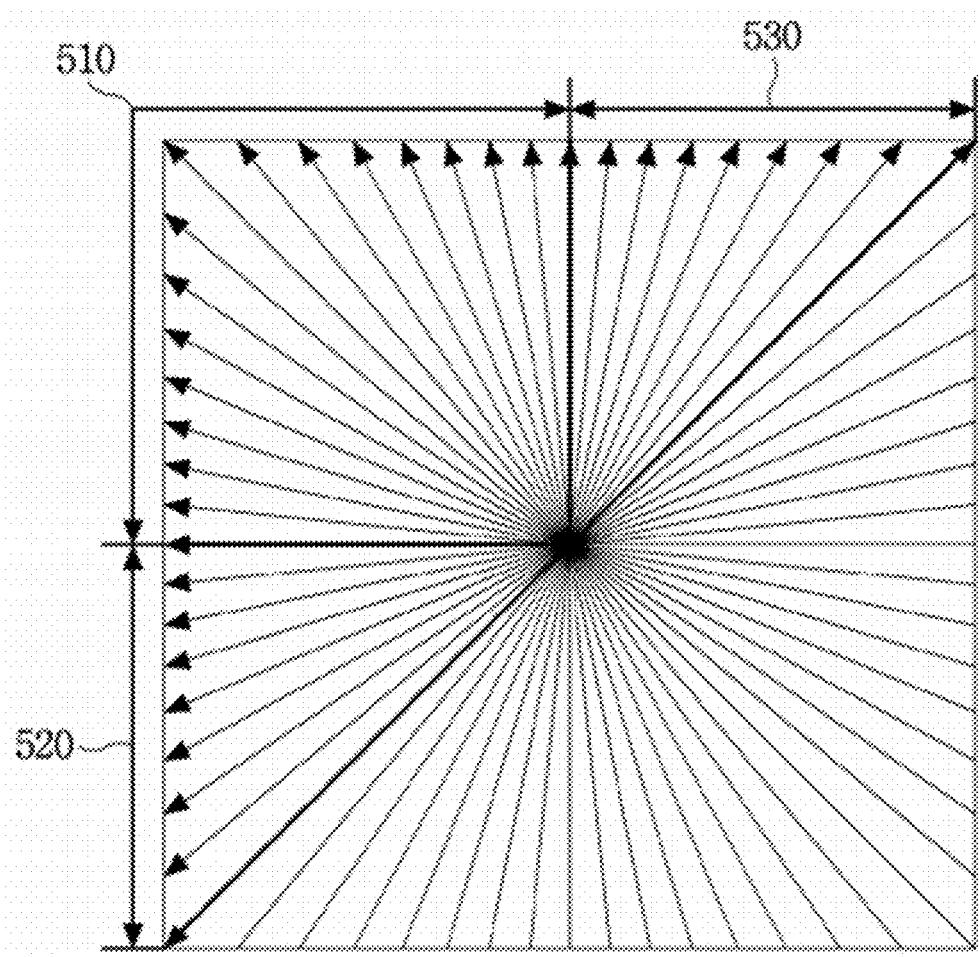
FIG. 5 is a diagram illustrating an example of a category related to a scanning order according to an embodiment of the present invention.

FIG. 5 is a diagram illustrating an example of a category related to a scanning order according to an embodiment of the present invention.

Scanning orders are classified into two, three, or more categories according to directionality of the intra prediction mode pre-defined in the device for encoding/decoding the image. Alternatively, the categories may be obtained by classification based on the number, range, and/or positions of samples referenced by the intra prediction mode of the current block.

The scanning order available for each category obtained by classification may be defined. As the scanning orders, z scanning, z scanning in the form of being rotated by a predetermined angle in a clockwise/counterclockwise direction, and the like may be used. The predetermined angle may be an angle of 90 degrees, 180 degrees, −90 degrees, or −180 degrees. For example, a first category may use z scanning, a second category may use z scanning in the form of being rotated by an angle of 90 degrees in a counterclockwise direction, and a third category may use z scanning in the form of being rotated by an angle of 90 degrees in a clockwise direction.

The number/types of scanning orders may be variably determined by taking the size of the block (for example, the coding block, the prediction block, and the transform block), the division type of the block, the transform type (for example, DCT, and DST), information on whether a non-zero transform coefficient is present, information on whether it is a transform skip block, a quantization parameter, and the like, into consideration. Alternatively, the number/types of scanning orders may be preset in the device for encoding/decoding the image.

Figure 6:
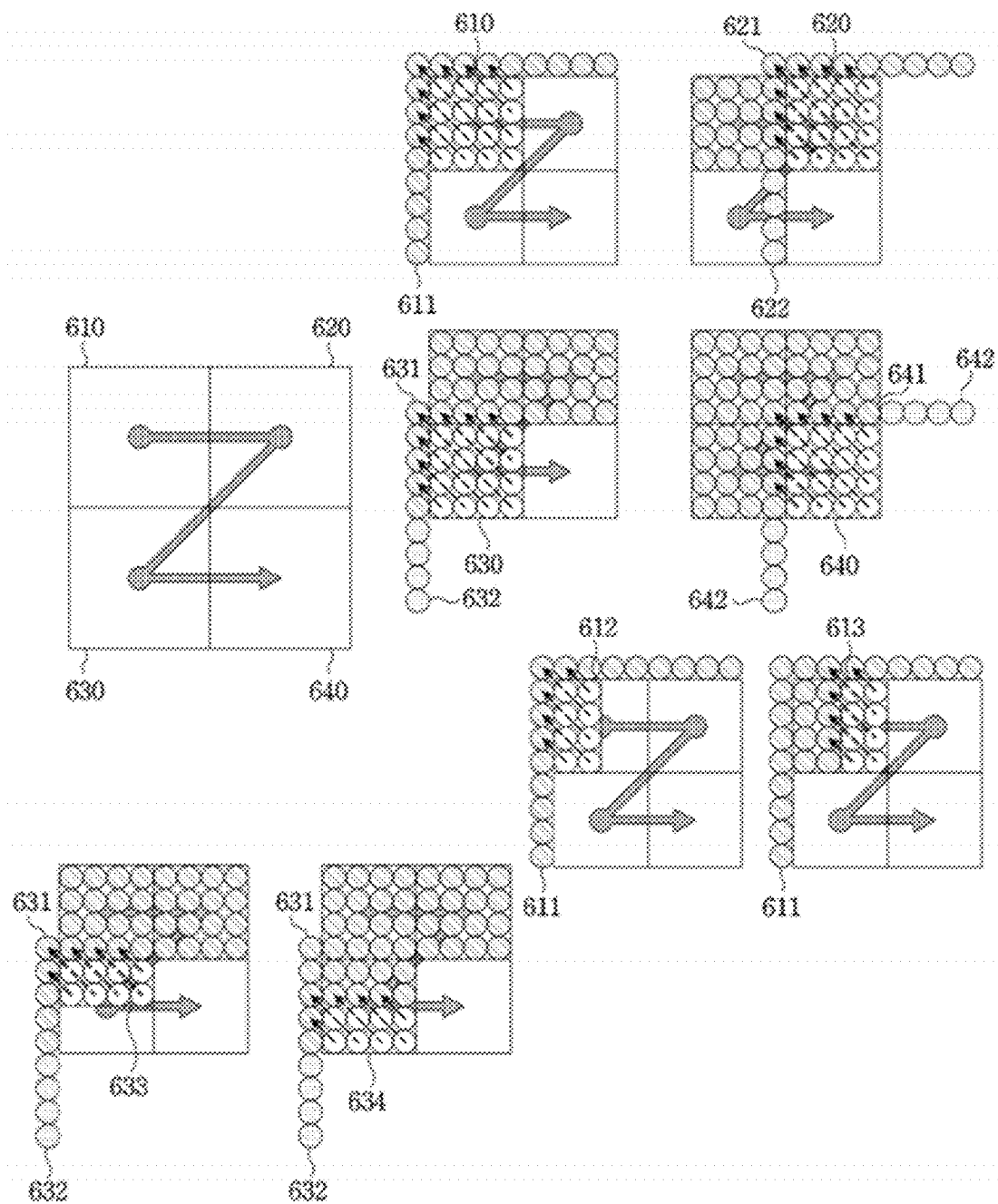
FIG. 6 is a diagram illustrating a process of intra prediction based on z scanning among adaptive scanning orders according to an embodiment of the present invention.

FIG. 6 is a diagram illustrating a process of intra prediction based on z scanning among adaptive scanning orders according to an embodiment of the present invention.

Referring to FIG. 6, according to directionality of the intra prediction mode, when referring to the top left nearby sample in a 135-degree direction, intra prediction may be performed on the basis of z scanning among the adaptive scanning orders. According to z scanning, prediction/reconstruction may be performed on a first sub block 610, a second sub block 620, a third sub block 630, and a fourth sub block 640 in this order.

The first sub block 610 may refer to a nearby sample 611 (a sample indicated in oblique lines) reconstructed before the first sub block.

Nearby samples of the second sub block 620 may include a pre-reconstructed nearby sample 621 (a sample indicated in oblique lines) and a non-reconstructed or reference-impossible sample 622 (a sample filled with dots). However, the second sub block 620 may be predicted/reconstructed with reference only to the pre-reconstructed nearby sample 621 of these nearby samples.

Similarly, nearby samples of the third sub block 630 may include a pre-reconstructed nearby sample 631 (a sample indicated in oblique lines) and a non-reconstructed or reference-impossible sample 632 (a sample filled with dots). However, the third sub block 630 may be predicted/reconstructed with reference only to the pre-reconstructed nearby sample 631 of these nearby samples.

Similarly, nearby samples of the fourth sub block 640 include a pre-reconstructed nearby sample 641 (a sample indicated in oblique lines) and a non-reconstructed or reference-impossible sample 642 (a sample filled with dots). However, the fourth sub block 640 may be predicted/reconstructed with reference only to the pre-reconstructed nearby sample 641 of these nearby samples.

In the meantime, one sub block may be divided into two non-square blocks. In this case, the scanning order for encoding/decoding the two non-square blocks may be determined on the basis of directionality of the intra prediction mode of the current block.

As shown in FIG. 6, the first sub block 610 may be divided into a first lower-layer block 612 and a second lower-layer block 613 that are non-square blocks in a vertical direction. Here, when the intra prediction mode refers to the top left nearby sample in a 135-degree direction, encoding/decoding is performed on the first lower-layer block 612 and the second lower-layer block 613 in this order. After performing prediction and reconstruction on the first lower-layer block 612, and prediction and reconstruction may be performed on the second lower-layer block 613. The second lower-layer block 613 may refer to at least one among the nearby sample of the first sub block 610 and the reconstruction sample of the first lower-layer block 612. Alternatively, after performing prediction on the first lower-layer block 612, prediction may be performed on the second lower-layer block 613. Here, the second lower-layer block 613 may refer to at least one among the nearby sample of the first sub block 610 and the prediction sample of the first lower-layer block 612.

Alternatively, as shown in FIG. 6, the third sub block 630 may be divided into a third lower-layer block 633 and a fourth lower-layer block 634 that are non-square blocks in a horizontal direction. Here, when the intra prediction mode refers to the top left nearby sample in a 135-degree direction, encoding/decoding is performed on the third lower-layer block 633 and the fourth lower-layer block 634 in this order. Similarly, after performing prediction and reconstruction on the third lower-layer block 633, prediction and reconstruction may be performed on the fourth lower-layer block 634. The fourth upper-layer block 634 may refer to at least one among the nearby sample of the third sub block 630 and the reconstruction sample of the third lower-layer block 633. Alternatively, after performing prediction on the third lower-layer block 633, prediction may be performed on the fourth lower-layer block 634. Here, the fourth lower-layer block 634 may refer to at least one among the nearby sample of the third sub block 630 and the prediction sample of the third lower-layer block 633.

Figure 7:
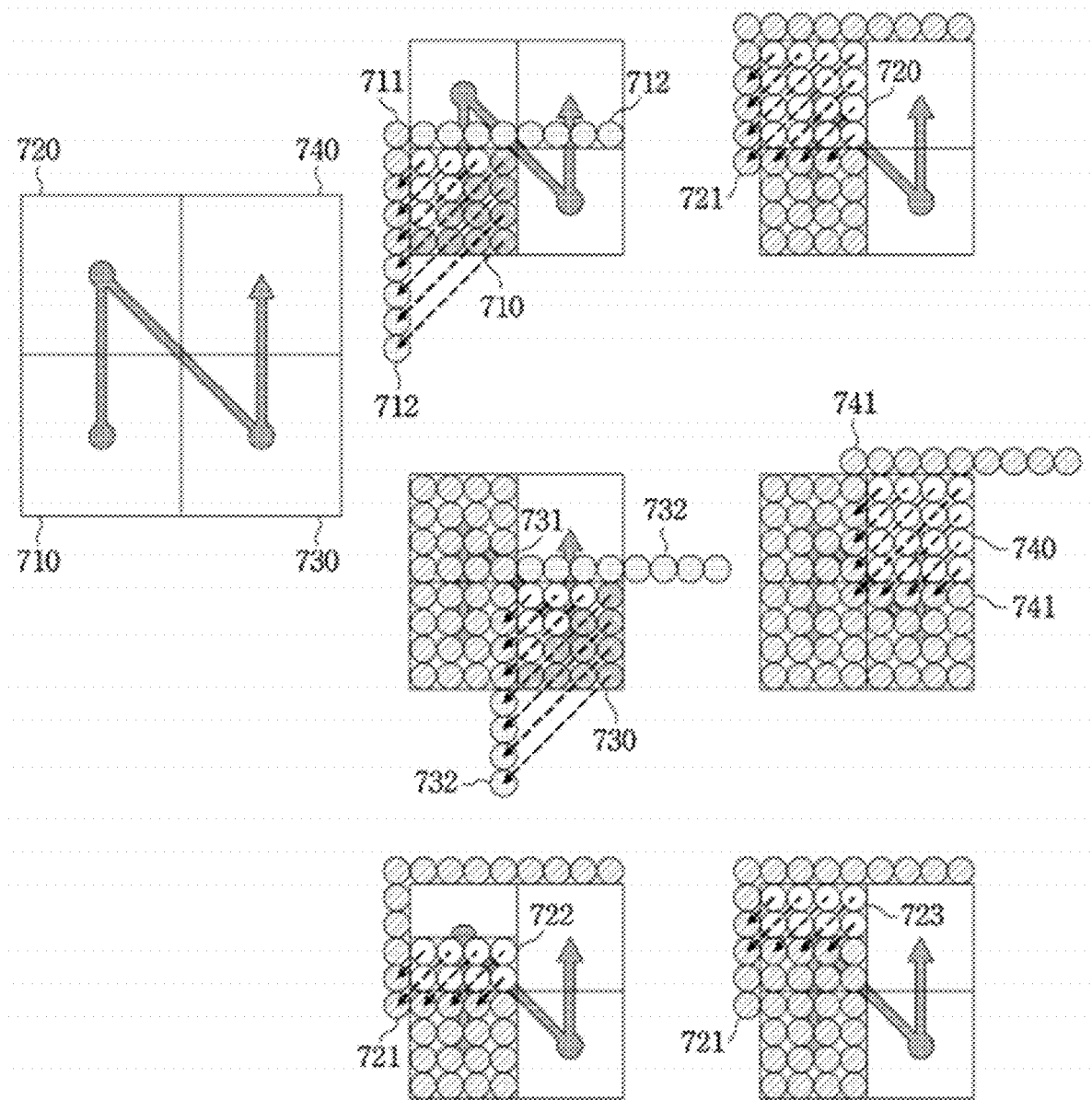
FIG. 7 is a diagram illustrating a process of intra prediction based on z scanning in the form of being rotated by an angle of 90 degrees in a counterclockwise direction among adaptive scanning orders according to an embodiment of the present invention.

FIG. 7 is a diagram illustrating a process of intra prediction based on z scanning in the form of being rotated by an angle of 90 degrees in a counterclockwise direction among adaptive scanning orders according to an embodiment of the present invention.

Referring to FIG. 7, according to directionality of the intra prediction mode, when referring to the bottom left nearby sample in a 225-degree direction, intra prediction may be performed on the basis of z scanning in the form of being rotated by an angle of 90 degrees in a counterclockwise direction among the adaptive scanning orders. According to z scanning in the form of being rotated by an angle of 90 degrees in a counterclockwise direction, prediction/reconstruction may be performed on a first sub block 710, a second sub block 720, a third sub block 730, and a fourth sub block 740 in this order.

The first sub block 710 may be separated into a region of samples indicated in white (hereinafter, referred to as "a first region") and a region of samples indicated in grayscale (hereinafter, referred to as "a second region"). The first region is a region that refers to a reference-possible or pre-reconstructed nearby sample 711 (a sample indicated in oblique lines), and the second region is a region that refers to a non-reconstructed or reference-impossible sample 712 a sample filled with dots). The sample of the region 712 may be generated using one or more samples belonging to the region 711. The sample of the second region may be predicted with reference to the generated sample of the region 712.

The second sub block 720 may be predicted/reconstructed with reference to a pre-reconstructed nearby sample 721 (a sample indicated in oblique lines). Here, the pre-reconstructed nearby sample 721 may include reconstruction samples of the first sub block 710, which are adjacent to the bottom of the second sub block.

The third sub block 730 may be separated into a region of samples indicated in white (hereinafter, referred to as "a first region") and a region of samples indicated in grayscale (hereinafter, referred to as "a second region"). The first region is a region that refers to a reference-possible or pre-reconstructed nearby sample 731 (a sample indicated in oblique lines), and the second region is a region that refers to a non-reconstructed or reference-impossible sample 732 (a sample filled with dots). The sample of the region 732 may be generated using one or more samples belonging to the region 731. The sample of the second region may be predicted with reference to the generated sample of the region 732.

The fourth sub block 740 may be predicted/reconstructed with reference to a pre-reconstructed nearby sample 741 (a sample indicated in oblique lines). Here, the pre-reconstructed nearby sample 741 may include reconstruction samples of the first sub block to the third sub block, which are adjacent to the fourth sub block.

As described above, according to directionality of the intra prediction mode, when using the adaptive scanning order, it is possible to minimize the occurrence of the second region referring to a non-reconstructed or reference-impossible, such as the second sub block 720 and the fourth sub block 740.

In the meantime, one sub block may be divided into two non-square blocks. In this case, the scanning order for encoding/decoding the two non-square blocks may be determined on the basis of directionality of the intra prediction mode of the current block.

As shown in FIG. 7, the second sub block 720 may be divided into a first lower-layer block 722 and a second lower-layer block 723 that are non-square blocks in a horizontal direction. Here, when the intra prediction mode refers to the bottom left nearby sample in a 225-degree direction, encoding/decoding may be performed on the first lower-layer block 722 and the second lower-layer block 723 in this order.

After performing prediction and reconstruction on the first lower-layer block 722, prediction and reconstruction may be performed on the second lower-layer block 723. The second lower-layer block 723 may refer to at least one among the nearby sample of the second sub block 720 and the reconstruction sample of the first lower-layer block 722. Alternatively, after performing prediction on the first lower-layer block 722, prediction may be performed on the second lower-layer block 723. Here, the second lower-layer block 723 may refer to at least one among the nearby sample of the second sub block 720 and the prediction sample of the first lower-layer block 722.

Figure 8:
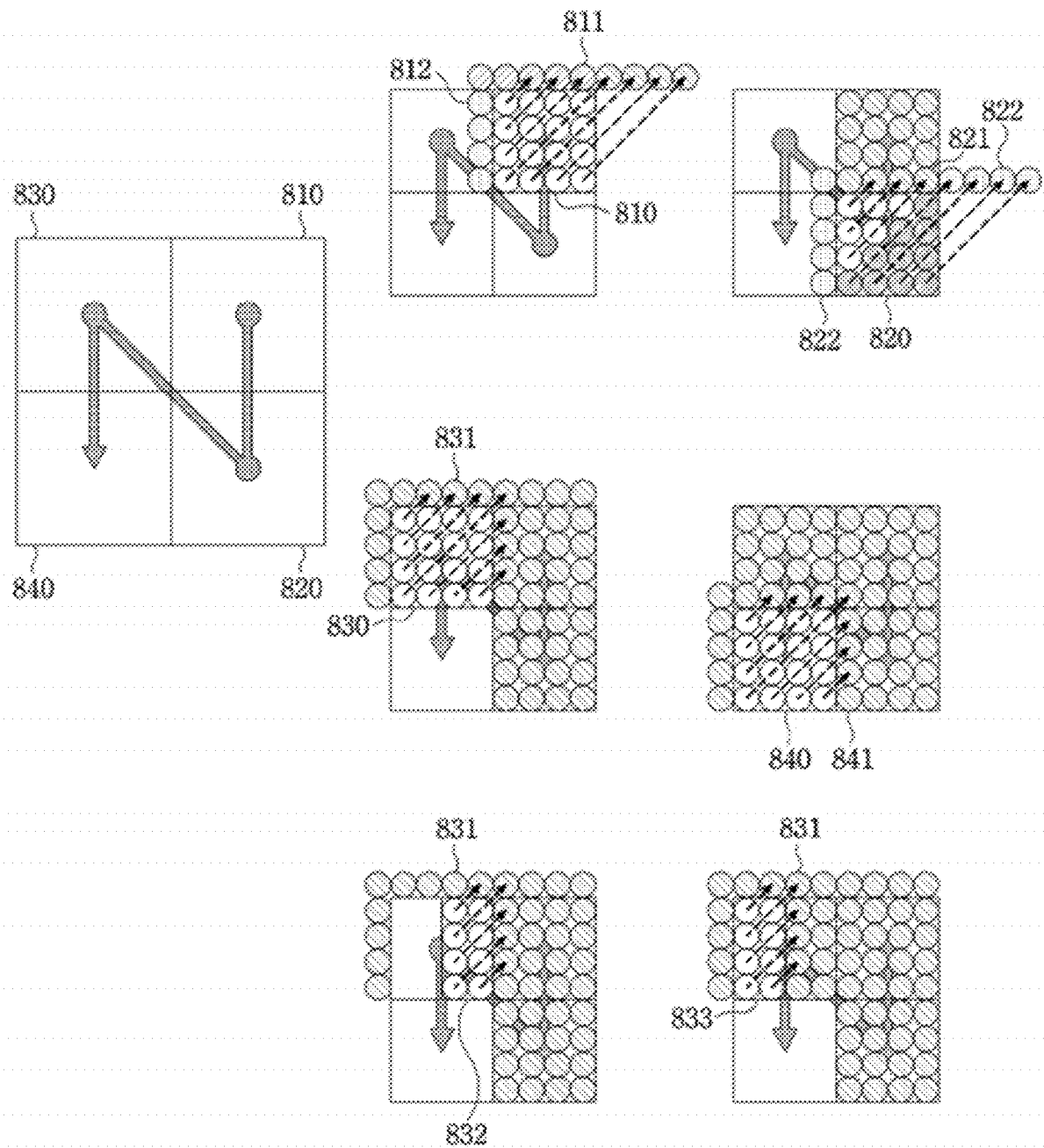
FIG. 8 is a diagram illustrating a process of intra prediction based on z scanning in the form of being rotated by an angle of 90 degrees in a clockwise direction among adaptive scanning orders according to an embodiment of the present invention.

FIG. 8 is a diagram illustrating a process of intra prediction based on z scanning in the form of being rotated by an angle of 90 degrees in a clockwise direction among adaptive scanning orders according to an embodiment of the present invention.

Referring to FIG. 8, according to directionality of the intra prediction mode, when referring to the top right nearby sample in a 45-degree direction, intra prediction may be performed on the basis of z scanning in the form of being rotated by an angle of 90 degrees in a clockwise direction among the adaptive scanning orders. According to z scanning in the form of being rotated by an angle of 90 degrees in a clockwise direction, prediction/reconstruction may be performed on a first sub block 810, a second sub block 820, a third sub block 830, and a fourth sub block 840 in this order.

The first sub block 810 may be predicted/reconstructed with reference to a pre-reconstructed nearby sample 811 (a sample indicated in oblique lines).

The second sub block 820 may be separated into a region of samples indicated in white (hereinafter, referred to as "a first region") and a region of samples indicated in grayscale (hereinafter, referred to as "a second region"). The first region is a region that refers to a reference-possible or pre-reconstructed nearby sample 821 (a sample indicated in oblique lines), and the second region is a region that refers to a non-reconstructed or reference-impossible sample 822 (a sample filled with dots). The sample of the region 822 may be generated using one or more samples belonging to the region 821. The sample of the second region may be predicted with reference to the generated sample of the region 822.

The third sub block 830 may be predicted/reconstructed with reference to a pre-reconstructed nearby sample 831 (a sample indicated in oblique lines). Here, the pre-reconstructed nearby sample 831 may include reconstruction samples of the first sub block 810 adjacent to the left of the third sub block.

The fourth sub block 840 may be predicted/reconstructed with reference to a pre-reconstructed nearby sample 841 (a sample indicated in oblique lines). Here, the pre-reconstructed nearby sample 841 may include reconstruction samples of the first sub block to the third sub block adjacent to the fourth sub block.

As described above, according to directionality of the intra prediction mode, when using the adaptive scanning order, it is possible to minimize the occurrence of the second region referring to a non-reconstructed or reference-impossible sample, such as the third sub block 830 and the fourth sub block 840.

In the meantime, one sub block may be divided into two non-square blocks. In this case, the scanning order for encoding/decoding the two non-square blocks may be determined on the basis of directionality of the intra prediction mode of the current block.

As shown in FIG. 8, the third sub block 830 may be divided into a first lower-layer block 832 and a second lower-layer block 833 that are non-square blocks in a vertical direction. Here, when the intra prediction mode refers to the top right nearby sample in a 45-degree direction, encoding/decoding may be performed on the first lower-layer block 832 and the second lower-layer block 833 in this order.

After performing prediction and reconstruction on the first lower-layer block 832, prediction and reconstruction may be performed on the second lower-layer block 833. The second lower-layer block 833 may refer to at least one among the nearby sample of the third sub block 830 and the reconstruction sample of the first lower-layer block 832. Alternatively, after performing prediction on the first lower-layer block 832, prediction may be performed on the second lower-layer block 833. Here, the second lower-layer block 833 may refer to at least one among the nearby sample of the third sub block 830 and prediction sample of the first lower-layer block 832.

Figure 9:
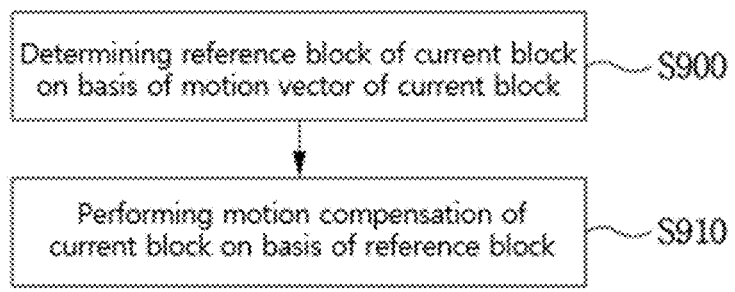
FIG. 9 is a diagram illustrating an inter prediction method based on a current picture reference mode according to an embodiment of the present invention.

FIG. 9 is a diagram illustrating an inter prediction method based on a current picture reference mode according to an embodiment of the present invention.

In the current picture reference mode, motion compensation is performed on the current block on the basis of the reference block belonging to the same picture as the current block. This may be segregated from the inter mode in which motion compensation is performed on the basis of a reference block belonging to a picture different from the current block. For the segregation, information indicating whether the current block is a block encoded in the current picture reference mode may be encoded/decoded. Alternatively, when the picture specified by the reference picture index of the current block is the current picture, the current block is determined as a block encoded in the current picture reference mode. The current picture is placed at a predetermined position within a reference picture list. The predetermined position may be a position pre-established in the device for encoding/decoding the image, or may be an arbitrary position like other reference pictures. For example, the current picture may be placed before a short-term reference picture, between the short-term reference picture and a long-term reference picture, or after the long-term reference picture.

Referring to FIG. 9, on the basis of the motion vector of the current block, the reference block of the current block may be determined at step S900.

When the current block is the block encoded in the current picture reference mode, the reference block is in the same picture as the current block. In contrast, when the current block is encoded in the inter mode, the reference block is in a picture different from current block.

The motion vector may be derived from the nearby block of the current block. Here, the nearby block may mean a block spatially and/or temporally adjacent to the current block. The spatially nearby block may include at least one of blocks adjacent to the left, the top, the bottom left, the top left, or the top right of the current block. The temporally nearby block may include at least one among a block in the same position as the current block, and the block adjacent to the left, the top, the right, the bottom, or each corner of the block positioned in the same position.

The motion vector may be derived by selectively using the nearby block satisfying a predetermined condition among the nearby blocks. Examples of the predetermined condition include whether the prediction mode (for example, the current picture reference mode, the inter mode, and the like) is the same as the current block, whether the same reference picture list as the current block is used, whether the same reference picture as the current block is referenced, and the like.

Alternatively, the motion vector may be determined on the basis of template matching. The template matching is a process of specifying the nearby region (hereinafter, referred to as "a template") of the current block and searching for a block having a most similar template to the template of the current block. The search may be performed on the entire or a part of a pre-reconstructed region within the current picture, or may be performed on a picture having a different time from the current picture.

Alternatively, the motion vector may be derived by taking the picture type of the current picture, the frequency of the motion vectors for the current picture reference mode, and the like into consideration, and this will be described in detail with reference to FIG. 10.

Referring to FIG. 9, on the basis of the reference block determined at step S900, motion compensation of the current block may be performed at step S910.

The reference block may be a block consisting of integer pels or may be a block consisting of fraction pels. Alternatively, by performing predetermined filtering on the reference block, a filtered reference block may be generated, and motion compensation may be performed using the filtered reference block. The filtering may be performed on the basis of a weighted filter that changes a sample value of the reference block by applying a predetermined weighting factor to the sample value, or may be performed on the basis of an interpolation filter that generates a fraction pel by interpolating the sample of the reference block.

The device for encoding the image may encode and signal filter information for filtering, and the device for decoding the image may filter the reference block on the basis of the signaled filter information.

The number of filters used in filtering may be one, two, three, or more. The filter may be a fixed coefficient filter pre-established in the device for encoding/decoding the image, or may be a variable coefficient filter. The device for encoding the image may encode and signal information indicating whether the variable coefficient filter is used, and the device for decoding the image may determine whether the variable coefficient filter is used, on the basis of the signaled information. The coefficient of the variable coefficient filter may be determined on the basis of a coefficient signaled from the device for encoding the image, or may be derived on the basis of one or more samples of the current block and/or one or more samples of the nearby block. Alternatively, the coefficient of the variable coefficient filter may be derived from the coefficient of the filter used before the current block, or may be derived on the basis of a pre-defined coefficient at a high level, such as a sequence, a picture, and the like. The coefficient may differ depending on the position of the sample being filtered.

Regarding precision of the fraction pel generated through the filtering, one of a ½ pel and ¼ pel may be selectively used. When the ½ pel is selected as the precision of the fraction pel, a ½ pel between two integer pels is generated. When the ¼ pel is selected as the precision of the fraction pel, a ¼ pel positioned between two integer pels is generated. The generated fraction pel may be generated using multiple samples positioned on the same vertical line and/or horizontal link. Here, the multiple samples may include at least one among the integer pel and the pre-generated fraction pel. The selection may be performed on the basis of information encoded to specify the precision of the fraction pel. Alternatively, a precision pre-established in the device for encoding/decoding the image may be fixedly used. The above-described precision of the ½ pel and ¼ pel is just an example, expansion to a ⅛ pel, a 1/16 pel, and the like is possible. For example, in the case of the precision of the 1/16 pel, except one integer pel, the coefficients of the filter for each of 15 fraction pels may be signaled or fixed. That is, 15 sets of filter coefficients may be signaled or pre-defined in the device for encoding/decoding the image.

The process of motion compensation at step S910 may further include a process of scaling the reference block or rotating the reference block by a predetermined angle. The scaling or rotating is to transform the reference block into the size/shape similar to the current block. This may be performed before or after the above-described filtering process. In the process of motion compensation at step S910, at least one among the filtering, scaling, and rotation may be omitted.

Figure 10:
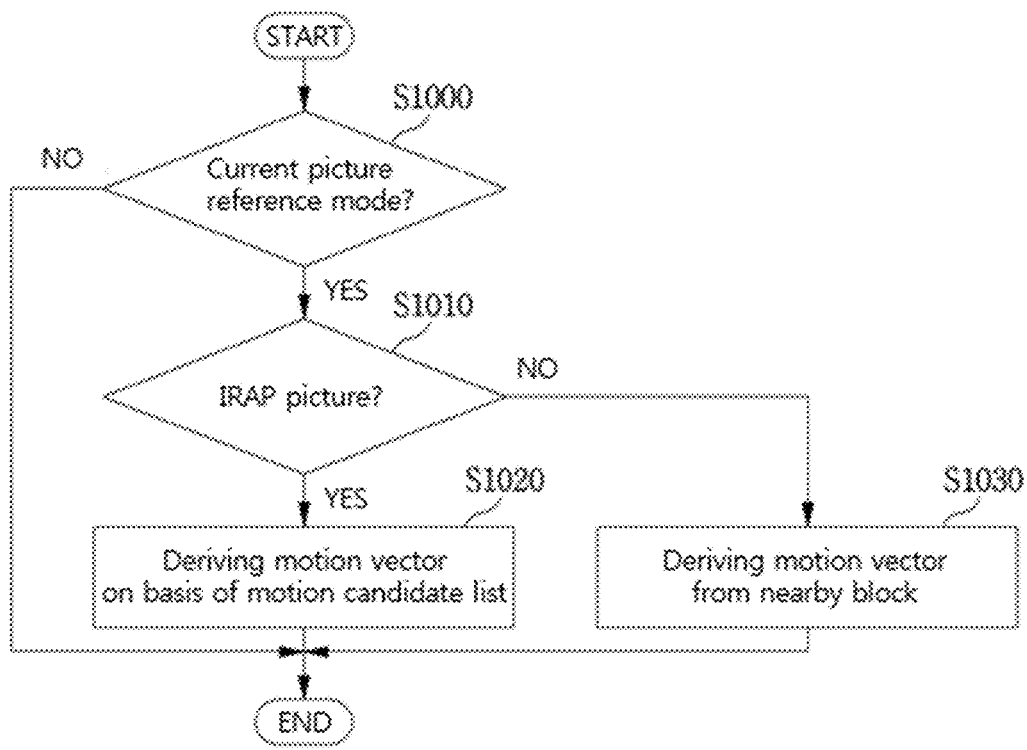
FIG. 10 is a diagram illustrating a method of deriving a motion vector of a current block encoded in a current picture reference mode according to an embodiment of the present invention.

FIG. 10 is a diagram illustrating a method of deriving a motion vector of a current block encoded in a current picture reference mode according to an embodiment of the present invention.

The motion vector of the current block encoded in the current picture reference mode may be derived from a predetermined motion candidate list. This may be performed when the current block belongs to an intra-random access point (IRAP) picture.

The motion candidate list may consist of motion vectors with high frequency, among motion vectors for the current picture reference mode. The range of motion vectors possibly included in the motion candidate list may be determined on the basis of at least one among a search range of the reference block for the current picture reference mode and whether wavefront parallel processing (WPP) is used. For example, the range of motion vectors possibly included in the motion candidate list may be limited to the motion vectors within the region already decoded through WPP, or may be limited to the motion vectors within the search range of the reference block for the current picture reference mode. For example, the motion candidate list for the current block may include a motion vector within a region already decoded before the current block. Further, after encoding/decoding of the current block is completed, the motion vector of the current block may be added to the motion candidate list. Thus, the motion vector of the current block may be used for encoding/decoding the block in the current picture reference mode after the current block.

Referring to FIG. 10, whether the current block is a block encoded in the current picture reference mode may be determined at step S1000. As described above with reference to FIG. 9, the determination may be performed on the basis of information indicating whether the current block is block encoded in the current picture reference mode, or may be performed on the basis of the reference picture index of the current block.

When the current block is the block encoded in the current picture reference mode, whether the current picture to which the current block belongs is an IRAP picture is determined at step S1010.

When the current picture is the IRAP picture, the motion vector is derived on the basis of the above-described motion candidate list at step S1020. In contrast, when the current picture is not the IRAP picture, the motion vector is derived from the nearby block at step S1030.

Figure 11:
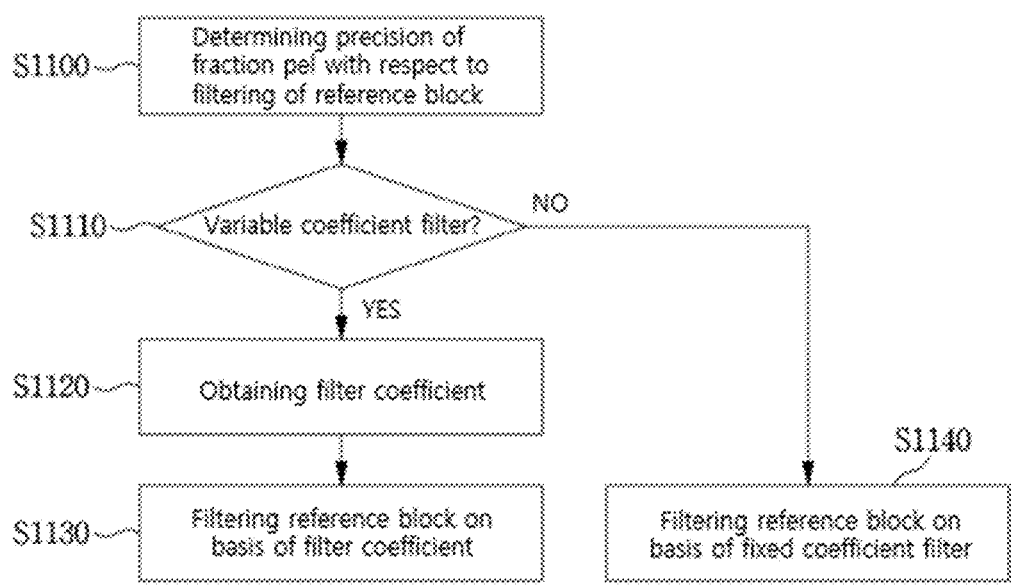
FIG. 11 is a diagram illustrating a method of filtering a reference block according to an embodiment of the present invention.

FIG. 11 is a diagram illustrating a method of filtering a reference block according to an embodiment of the present invention.

Referring to FIG. 11, a precision of the fraction pel with respect to filtering of the reference block may be determined at step S1100. Examples of the precision of the fraction pel may include a ½ pel, a ¼ pel, a ⅛ pel, a 1/16 pel, and the like. The precision of the fraction pel may be determined on the basis of information encoded to specify the precision of the fraction pel with respect to the filtering. Alternatively, as the precision of the fraction pel, a precision pre-established in the device for encoding/decoding the image may be used, and in this case, performance at step S1100 may be omitted.

Whether the filter used in filtering is the variable coefficient filter may be determined at step S1110. This determination may be performed on the basis of information indicating whether the variable coefficient filter is used.

When the filter is the variable coefficient filter, the coefficient of the filter is checked at step S1120. The coefficient may be obtained through a bitstream, or may be derived using the nearby sample. Alternatively, the coefficient may be derived from the filter coefficient used before the current block. On the basis of the coefficient obtained at step S1120, the reference block may be filtered at step S1130.

In contrast, when the filter is not the variable coefficient filter, the reference block is filtered on the basis of the fixed coefficient filter pre-established in the device for encoding/decoding the image at step S1140.

In the meantime, the embodiment does not limit the temporal order between a step of determining the precision of the fraction pel and a step of determining whether the variable coefficient filter is used. The step of determining the precision of the fraction pel may be performed after the step of determining whether the variable coefficient filter is used, or these steps may be independently performed.

Figure 12:
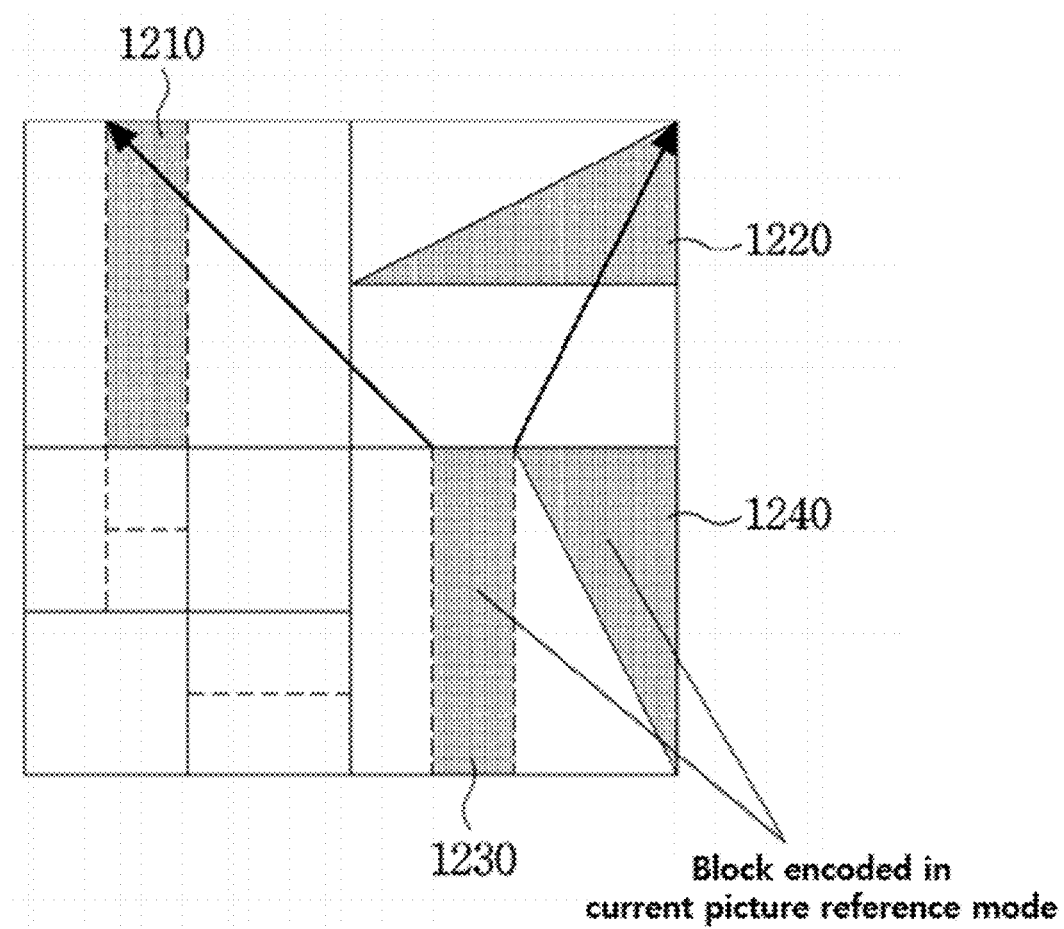
FIG. 12 is a diagram illustrating a shape of a current block encoded in a current picture reference mode according to an embodiment of the present invention.

FIG. 12 is a diagram illustrating a shape of a current block encoded in a current picture reference mode according to an embodiment of the present invention.

Even when the current block is divided into squares or non-squares, the current picture reference mode is used. Alternatively, as shown in FIG. 12, even when the current block are divided in an arbitrary shape such as a triangle, and the like, the current picture reference mode is used.

Referring to FIG. 12, blocks 1210 and 1230 are non-square blocks subjected to division, and blocks 1220 and 1240 are blocks subjected to division in arbitrary shapes. The block 1230 may use the block 1210 as a reference block, and the block 1240 may use the block 1220 as a reference block. Here, a process of rotating the block 1220 by a predetermined angle may be involved.

Alternatively, by taking the size/shape of the current block, the current picture reference mode may be used in a limited manner. For example, when the size of the current block is greater than a threshold size, the current picture reference mode is not allowed. Alternatively, when the division type of the current block is N×M, the current picture reference mode is not allowed. Here, the N and M are integers greater than zero and may be the same or different from each other. The N×M may be pre-established in the device for encoding/decoding the image, or may be derived on the basis of information encoded to indicate the block size/shape in which the current picture reference mode is allowed.

Figure 13:
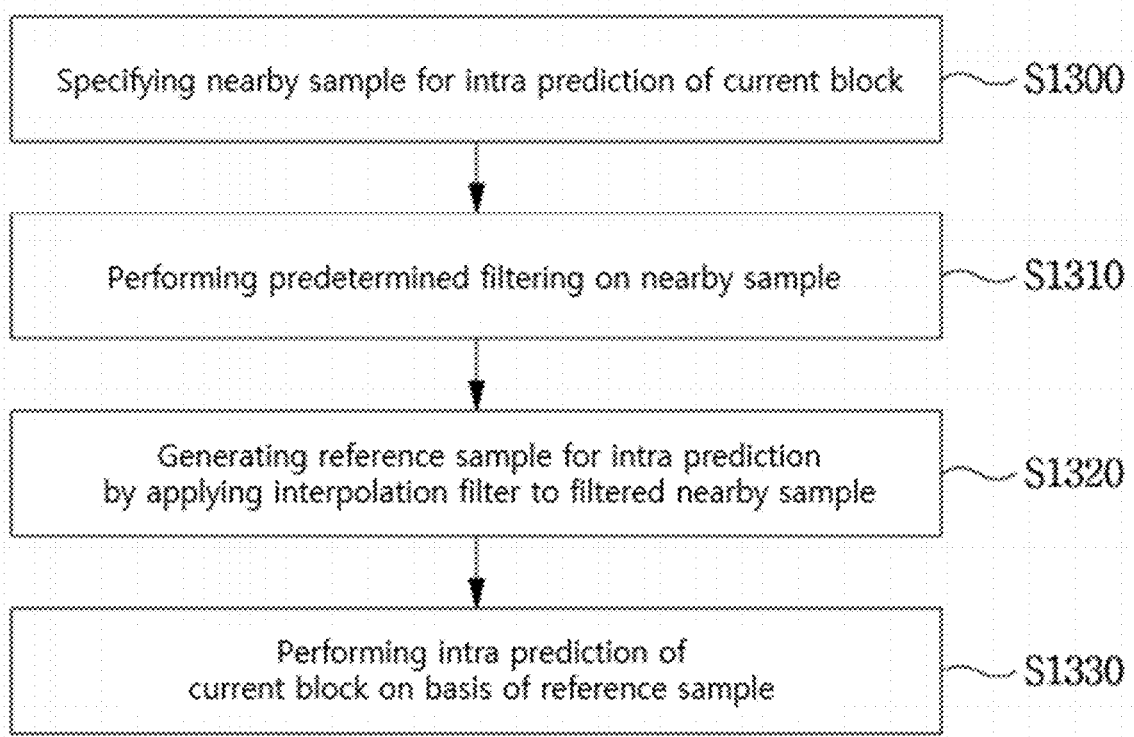
FIG. 13 is a diagram illustrating a process of intra prediction based on interpolation according to an embodiment of the present invention.

FIG. 13 is a diagram illustrating a process of intra prediction based on interpolation according to an embodiment of the present invention.

Referring to FIG. 13, the nearby sample for intra prediction of the current block may be specified at step S1300. The nearby sample may belong to a block adjacent to the left, the bottom left, the top left, the top, or the top right of the current block. When there is still a non-reconstructed or reference-impossible sample among the nearby samples, it is replaced by the pre-reconstructed sample or the reference-possible sample among the nearby samples.

The predetermined filtering may be performed on the specified nearby sample at step S1310. The filtering is a process of generating the filtered nearby sample of an integer precision by applying a predetermined weighting factor to the nearby sample of an integer precision. The filtering may be selectively performed on the basis of the intra prediction mode of the current block, the block size, the block shape, variation in nearby samples adjacent to each other, and the like.

By applying the interpolation filter to the filtered nearby sample, the reference sample for intra prediction may be generated at step S1320.

Whether the interpolation filter is applied may be determined on the basis of a flag encoded to indicate whether the interpolation filter is applied. The flag may be signaled at least one level among a sequence, a picture, a slice, and a block. Alternatively, whether the interpolation filter is applied may be determined by further taking the intra prediction mode of the current block into consideration. For example, when the intra prediction mode is a mode in which the sample of an integer precision is referenced (for example, a planar mode, a DC mode, a horizontal mode, and a vertical mode), the interpolation filter is not applied to the nearby sample. For example, whether the filter is applied may be determined on the basis of a flag signaled at a block level.

Examples of the interpolation filter include a linear interpolation filter, a cube interpolation filter, a Gaussian interpolation filter, and the like. The device for encoding/decoding the image may define multiple interpolation filters, and one of these may be selectively used. For example, the device for encoding/decoding the image may selectively use one of two filters. For example, one of the two filters may be the Gaussian interpolation filter.

The interpolation filter may be determined by taking at least one of the size and intra prediction mode of the current block into consideration. The current block may be the coding block (CU), the prediction block (PU), or the transform block (TU).

The block size may be expressed by the width/height of the block, the sum of the width and the height, the average value of the width and the height, the number of samples belonging to the relevant block, and the like. That is, the interpolation filter may be determined on the basis of at least one among the width of the block, the height of the block, the width and the height of the block, and the ratio of the width and the height of the block. The sum of the width and the height of the block may be the sum of values in which the width and the height of the block are represented in a logarithmic scale.

For example, a first interpolation filter may be applied to a block smaller than a predetermined threshold size, and a second interpolation filter may be applied to a block equal to or greater than the threshold size. The first and second interpolation filters are different from each other in terms of at least one among the filter coefficient, the number of taps, and the filter intensity. Alternatively, the first interpolation filter may be one of the types of described interpolation filters, and the second interpolation filter may be another one. The threshold size may be preset in the device for encoding/decoding the image, or may be variably determined by taking a specific encoding parameter into consideration. Alternatively, the same interpolation filter may be applied to all block sizes, or different interpolation filters may be applied to respective block sizes.

The intra prediction modes pre-defined in the device for encoding/decoding the image may be classified into multiple groups by taking directionalities of the intra prediction modes into consideration. For example, the pre-defined intra prediction modes may be classified into a first group with a first directionality, a second group with a second directionality, a third group with a third directionality, and the like. The number of groups may be in a range of 1 to the number of pre-defined intra prediction modes. Each group may consist of one or more intra prediction modes. The multiple intra prediction modes belonging to each group may have similar directionality. On the basis of directionality of the intra prediction mode, the interpolation filter may be determined.

Alternatively, the device for encoding the image may encode and signal information determining the interpolation filter, and the device for decoding the image may determine the interpolation filter on the basis of the signaled information. The information may be signaled in at least one of a sequence, a picture, a slice, and a block level. For example, the interpolation filter may be determined on the basis of information signaled at the block level.

The determination of the interpolation filter may mean determination of at least one of the filter coefficient, the filter intensity, the number of taps, and the type of the interpolation filter.

On the basis of the generated reference sample, intra prediction of the current block may be performed at step S1330. For example, the reference sample may be set as a prediction sample of the current block. The current block may be reconstructed by adding the decoded residual sample to the prediction sample. Alternatively, the reference sample may be set as a reconstruction sample of the current block. In this case, a residual signal for the current block may not be signaled or may not be reconstructed.

Figure 14:
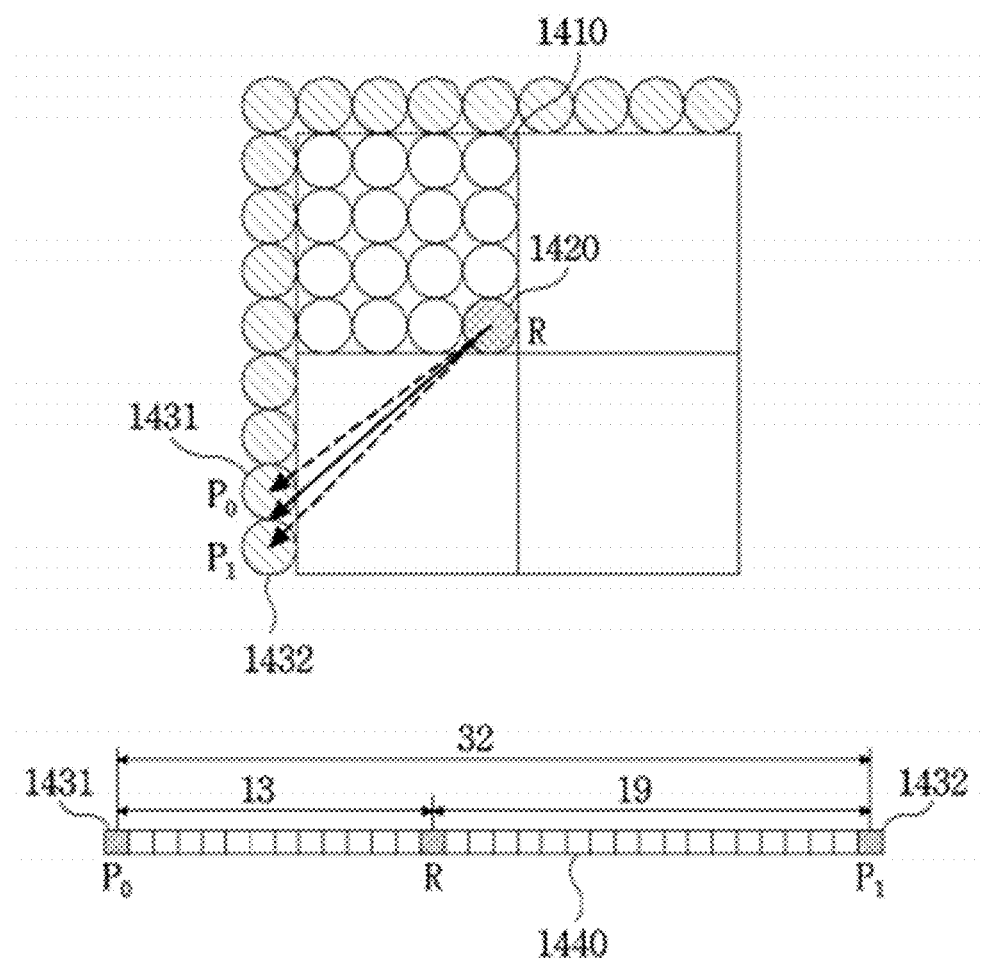
FIG. 14 is a diagram illustrating a method of applying an interpolation filter according to an embodiment of the present invention.

FIG. 14 is a diagram illustrating a method of applying an interpolation filter according to an embodiment of the present invention.

By applying the interpolation filter to multiple nearby samples adjacent to the current block, the reference sample for intra prediction may be generated. The nearby sample may include at least one among the sample of an integer precision and the sample of a fraction precision. The number of nearby samples to which the interpolation filter is applied may be two, three, four, five, six, or more. The number of nearby samples may be variably determined on the basis of at least one among the intra prediction mode of the current block and the position of the sample which is a prediction/reconstruction target within the current block. Alternatively, the number of nearby samples may be a fixed number pre-established in the device for encoding/decoding the image. The position of the nearby sample may be determined on the basis of at least one among the intra prediction mode of the current block and the position of the sample which is the prediction/reconstruction target within the current block. For example, the interpolation filter may be pre-defined in the device for encoding/decoding the image in such a manner as to be applied to four nearby samples.

Referring to FIG. 14, on the basis of the position of the sample which is a prediction/reconstruction target within a current block 1410 and the intra prediction mode of the current block, nearby samples 1431 1432 with the integer precision may be specified. By interpolating the nearby samples 1431 and 1432, a reference sample 1420 may be generated between the nearby samples 1431 and 1432. Here, the reference sample 1420 may be a sample with a real number precision. The position of the reference sample may be specified on the basis of at least one among the position of the sample which is the prediction/reconstruction target within the current block 1410 and the intra prediction mode of the current block.

As shown in FIG. 14, the space between a P0 1431 and a P1 1432 which are nearby samples of the integer precision may be divided into multiple interpolation sample positions. The interpolation sample positions may have the real number precision. The number of interpolation sample positions is N, and the N may be an integer greater than one. On the basis of the intra prediction mode of the current block, among the interpolation sample positions, the position at which the reference sample is generated may be determined For example, the space between the nearby samples P0 1431 and P1 1432 may be divided into 32 interpolation sample positions with the real number precision. Here, the position of the reference sample 1420 generated through interpolation is $13/32$, and on the basis of this position, the interpolation filter is applied to the P0 1431 and P1 1432 so that the reference sample is generated.

Figure 15:
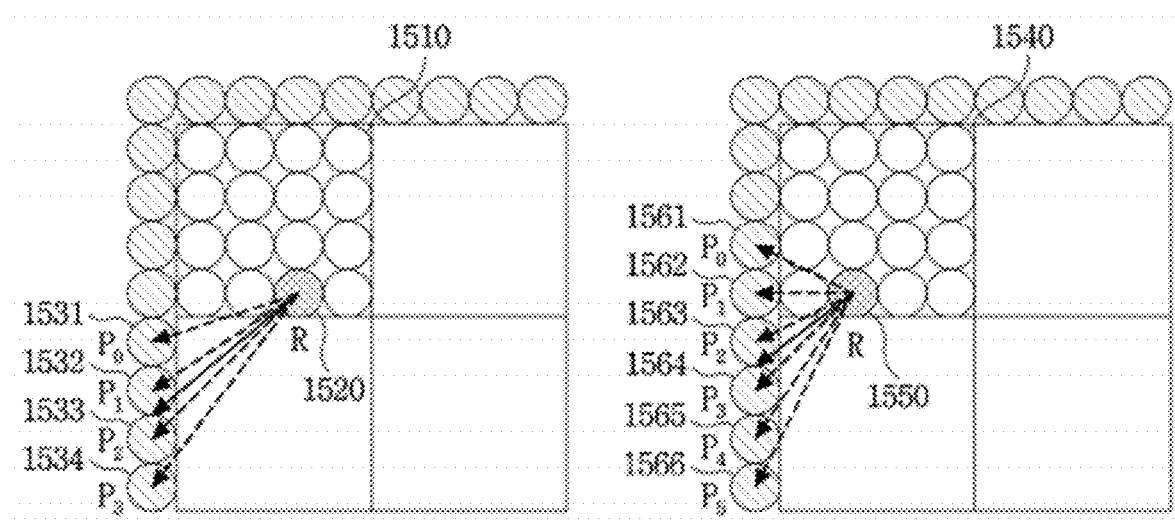
FIG. 15 is a diagram illustrating an example of an interpolation filter using multiple taps according to an embodiment of the present invention.

FIG. 15 is a diagram illustrating an example of an interpolation filter using multiple taps according to an embodiment of the present invention.

In the present invention, the number of taps of the interpolation filter may be determined on the basis of at least one among the size of the current block, whether the intra prediction mode is the directional mode, the directionality/angle of the intra prediction mode, and encoded information to specify the number of taps. The number of taps of the interpolation filter may be two, three, four, five, six, or more.

Hereinafter, for convenience of description, the cases where the number of taps is four and six will be described respectively.

Referring to FIG. 15, on the basis of at least one among the position of the prediction/reconstruction target sample within the current block 1510 and the intra prediction mode of the current block, a reference sample 1520 for intra prediction may be generated between at least two nearby samples among nearby samples 1531, 1532, 1533, and 1534 of the integer precision. The two nearby samples may be nearby samples adjacent to each other or may be arranged in a discontinuous manner.

On the basis of at least one among the position of the prediction/reconstruction target sample within the current block 1510 and the intra prediction mode of the current block, the four positions of the nearby samples P0 1531, P1 1532, P2 1533, and P3 1534 with the integer precision to which the interpolation filter is applied may be determined. Also, on the basis of at least one among the position of the prediction/reconstruction target sample within the current block 1510 and the intra prediction mode of the current block, the position of the reference sample 1520 being interpolated may be determined between the P1 1532 and the P2 1533. The reference sample 1520 being interpolated may have the real number precision.

By applying the interpolation filter to the four nearby samples, the reference sample 1520 may be generated.

Referring to FIG. 15, on the basis of at least one among the position of the prediction/reconstruction target sample within the current block 1540 and the intra prediction mode of the current block, a reference sample 1550 for intra prediction may be generated between at least two nearby samples among nearby samples 1561, 1562, 1563, 1564, 1565, and 1566 of the integer precision. The two nearby samples may be nearby samples adjacent to each other, or may be arranged in a discontinuous manner.

On the basis of at least one among the position of the prediction/reconstruction target sample within the current block 1540 and the intra prediction mode of the current block, the six positions of the nearby samples P0 1561, P1 1562, P2 1563, P3 1564, P4 1565, and P5 1566 with the integer precision to which the interpolation filter is applied may be determined. Also, on the basis of at least one among the position of the prediction/reconstruction target sample within the current block 1540 and the intra prediction mode of the current block, the position of the reference sample 1550 being interpolated may be determined between the P2 1563 and the P3 1564. The reference sample 1550 being interpolated may have the real number precision.

By applying the interpolation filter to the four nearby samples, the reference sample 1550 may be generated.

Although exemplary methods of the present invention are represented as a series of operations for clarity of description, the order of the steps is not limited thereto. When necessary, the illustrated steps may be performed simultaneously or in a different order. In order to realize the method according to the present invention, other steps may be added to the illustrative steps, some steps may be excluded from the illustrative steps, or some steps may be excluded while additional steps may be included.

The various embodiments of the present invention are not intended to list all possible combinations, but to illustrate representative aspects of the present invention. The matters described in the various embodiments may be applied independently or in a combination of two or more.

Also, the various embodiments of the present invention may be implemented by hardware, firmware, software, or a combination thereof. With hardware implementation, the embodiment may be implemented by using at least one selected from a group of application specific integrated circuits (ASICs), digital signal processors (DSPs), digital signal processing devices (DSPDs), programmable logic devices (PLDs), field programmable gate arrays (FPGAs), general-purpose processors, controllers, micro controllers, micro processors, etc.

The scope of the present invention includes software or machine-executable instructions (e.g., an operating system, an application, firmware, a program, etc.) that cause operation according to the methods of the various embodiments to be performed on a device or a computer, and includes a non-transitory computer-readable medium storing such software or instructions to execute on a device or a computer.

INDUSTRIAL APPLICABILITY

The present invention may be used in encoding/decoding a video signal.

The invention claimed is:

1. An image decoding method comprising:
determining an intra prediction mode of a current block;
determining whether to apply a first filter for neighboring samples of the current block based on the intra prediction mode of the current block and a size of the current block;
filtering the neighboring samples to generate filtered neighboring samples based on the determination that the first filter is applied to the neighboring samples;
applying a second filter for the filtered neighboring samples to generate reference samples; and
generating a prediction block of the current block based on the reference samples,
wherein the second filter is an interpolation filter which uses four samples among the filtered neighboring samples,
wherein the second filter is selected based on the size of the current block, and
wherein the size of the current block is an average of a width and a height of the current block in a logarithmic scale.

2. The image decoding method of claim 1,
wherein the second filter is selected based on information signaled at a block level.

3. An image encoding method comprising:
determining an intra prediction mode of a current block;
determining whether to apply a first filter for neighboring samples of the current block based on the intra prediction mode of the current block and a size of the current block;
filtering the neighboring samples to generate filtered neighboring samples based on the determination that the first filter is applied to the neighboring samples;
applying a second filter for the filtered neighboring samples to generate reference samples; and
generating a prediction block of the current block based on the reference samples,
wherein the second filter is an interpolation filter which uses four samples among the filtered neighboring samples,
wherein the second filter is selected based on the size of the current block, and
wherein the size of the current block is an average of a width and a height of the current block in a logarithmic scale.

4. The image encoding method of claim 3,
wherein the second filter is selected based on information signaled at a block level.

5. A non-transitory computer-readable recording medium storing a bitstream that is generated by an image encoding method with an encoding apparatus, wherein the image encoding method comprises:
  determining an intra prediction mode of a current block;
  determining whether to apply a first filter for neighboring samples of the current block based on the intra prediction mode of the current block and a size of the current block;
  filtering the neighboring samples to generate filtered neighboring samples based on the determination that the first filter is applied to the neighboring samples;
  applying a second filter for the filtered neighboring samples to generate reference samples; and
  generating a prediction block of the current block based on the reference samples,
  wherein the second filter is an interpolation filter which uses four samples among the filtered neighboring samples,
  wherein the second filter is selected based on the size of the current block, and
  wherein the size of the current block is an average of a width and a height of the current block in a logarithmic scale.

6. The image decoding method of claim 1,
wherein the second filter is selected as one among a plurality of filters including a Gaussian interpolation filter.

* * * * *